US005884657A

United States Patent [19]

Srock

[11] Patent Number: 5,884,657

[45] Date of Patent: Mar. 23, 1999

[54] FLUID RECLAMATION APPARATUS

[76] Inventor: Bryan J. Srock, 1226 SE. 12th Ave., Deerfield Beach, Fla. 33441

[21] Appl. No.: 869,957

[22] Filed: Jun. 5, 1997

Related U.S. Application Data

[63] Continuation-in-part of Ser. No. 741,922, Oct. 31, 1996, abandoned.

[51] Int. Cl.[6] .............................. F16L 39/02; F16L 55/07

[52] U.S. Cl. ................................ 137/312; 73/46; 73/49.1; 116/276; 137/559; 138/104; 138/114; 141/86; 222/108; 222/110; 285/13; 285/45; 285/133.1; 285/138

[58] Field of Search .................................... 73/40.5 R, 46, 73/49.1, 49.8; 137/312, 559; 138/111, 113, 114, 104; 141/86; 222/108, 109, 110, 111; 285/45, 133.1, 138, 13; 116/276

[56] References Cited

U.S. PATENT DOCUMENTS

| | | | |
|---|---|---|---|
| 2,181,002 | 11/1939 | Warner | 285/133.1 |
| 2,255,291 | 9/1941 | Fear | 138/104 |
| 2,342,616 | 2/1944 | O'Brien | 138/104 |
| 2,838,074 | 6/1958 | Lauck | 285/133.1 |
| 2,956,586 | 10/1960 | Zeigler et al. | 285/133.1 |
| 3,472,062 | 10/1969 | Owen | 138/104 |
| 3,532,131 | 10/1970 | Lefere | 138/114 |
| 3,974,862 | 8/1976 | Fuhrmann | 138/114 |
| 4,062,376 | 12/1977 | McGrath | 138/114 |
| 4,341,235 | 7/1982 | Nord | 137/312 |
| 4,377,545 | 3/1983 | Hornbeck | 138/114 |
| 4,445,332 | 5/1984 | Thies et al. | 285/133.1 |
| 4,644,780 | 2/1987 | Jeter | 138/104 |
| 5,307,669 | 5/1994 | Nishio | 73/46 |
| 5,379,804 | 1/1995 | Dunn et al. | 138/104 |

*Primary Examiner*—George L. Walton
*Attorney, Agent, or Firm*—Oltman, Flynn & Kubler

[57] ABSTRACT

A reclamation apparatus for capturing leaking hydraulic fluid in a hydraulic system having a higher pressure system end and a lower pressure system end and for delivering the captured fluid back into the system includes an inner fluid line, for carrying hydraulic fluid between two points in the hydraulic system, having a higher pressure first line end and a lower pressure second line end, a reinforcing sleeve containing the inner fluid line and having an inside diameter larger than the inner fluid line outside diameter, an outer fluid line containing the inner fluid line and the reinforcing sleeve and having a first line end, a second line end and an inside diameter larger than the reinforcing sleeve outside diameter so that a containment space is provided between the reinforcing sleeve and the outer fluid line, a line coupling structure connected to the inner and outer fluid line first ends, a manifold structure connected to the inner and outer fluid line second ends and including a manifold body connected to the inner and outer fluid line second ends and a sight glass for providing visual indication of fluid outside of the inner fluid line, and a reclamation line in fluid communication with the containment space and the inner fluid line at another point in the system to return leaked fluid to the system.

12 Claims, 4 Drawing Sheets

FLUID RECLAMATION APPARATUS

This is a continuation-in-part of application Ser. No. 08/741,922, filed Oct. 31, 1996, which has been abandoned.

BACKGROUND OF THE INVENTION

1. Field of the Invention

The present invention relates generally to the field of hydraulic equipment and systems. More specifically the present invention relates to a reclamation apparatus for capturing fluid leaking from a hydraulic fluid line and delivering the fluid back into the hydraulic system. The apparatus may be incorporated into virtually any hydraulically driven machinery, such as a cardboard box bailer or garbage truck compacting door, or cargo moving equipment on a ship.

The apparatus includes an inner fluid line having a certain inner fluid line outside diameter for carrying hydraulic fluid between two points in a hydraulic system, such as between a fluid pump and a fluid powered mechanism. The apparatus also includes a reinforcing sleeve having a reinforcing sleeve inside diameter larger than the inner fluid line outside diameter to contain the inner fluid line. The apparatus also includes an outer fluid line having an outer fluid line inside diameter larger than the reinforcing sleeve outside diameter to contain the reinforcing sleeve and inner fluid line so that a substantially annular containment space is provided between the reinforcing sleeve and the outer fluid line. The inner and outer fluid lines are concentrically connected at a higher pressure first fluid line end to a coupling structure and at a lower pressure second line end to a manifold structure. The coupling structure may be of conventional construction, differing only in the provision of concentric line coupler fittings. The apparatus also includes a reclamation line, having a coupler with a check valve to prevent fluid backflow, to return the fluid back into the system.

In the event the inner fluid line ruptures, the fluid is contained by the outer fluid line and is subsequently delivered, through the reclamation line, back into the system. The reinforcing sleeve prevents the outer fluid line from rupturing due to the force from the inner fluid line rupture. In this way the system can continue to function until the rupture is repaired or the inner fluid line is replaced.

2. Description of the Prior Art

There have long been hydraulic systems for powering construction and industrial equipment, automobile power drive assemblies, trash compactors, and many other devices. Yet these systems have been subject to sudden failure upon the rupture of any line in the system containing the hydraulic fluid. Such failure often leads to long and costly shut-downs, inoperability in critical situations and to damage from the discharge of fluid onto vulnerable surrounding surfaces.

Various devices have been developed to address this problem. These devices, shown in U.S. Pat. Nos. 2,838,074, 4,445,332 and 2,181,002, utilize an outer hose or tube to enclose the fluid line so that leaking fluid may be captured and returned to the system. However, these devices do not prevent the outer hose or tube from rupturing due to the force or pressure caused by the fluid line rupturing. Accordingly, there is a need in the art for an apparatus which will capture fluid from a ruptured fluid line and return it to the system and which will prevent the outer hose or tube from rupturing due to the force or pressure caused by the fluid line rupturing.

It is thus an object of the present invention to provide a hydraulic fluid containment and reclamation apparatus for a hydraulic system which captures fluid escaping from a ruptured hydraulic line and delivers the fluid back into the system.

It is another object of the present invention to provide such an apparatus which prevents the outer fluid line from rupturing due to the force from the inner fluid line rupture.

It is yet another object of the present invention to provide such an apparatus which delivers the fluid back into the system at a point of higher fluid pressure than the pressure at the point of rupture.

It is a further object of the present invention to provide such an apparatus which permits the system to continue operating until the ruptured line is either repaired or replaced.

It is still another object of the present invention to provide such an apparatus which provides visual indication of fluid outside of the inner fluid line.

It is finally an object of the present invention to provide such an apparatus which is inexpensive to manufacture, compact and very reliable.

SUMMARY OF THE INVENTION

The present invention accomplishes the above-stated objectives, as well as others, as may be determined by a fair reading and interpretation of the entire specification.

A reclamation apparatus is provided for capturing leaking hydraulic fluid in a hydraulic system having a higher pressure system end and a lower pressure system end and for delivering the captured fluid back into the system, including an inner fluid line for carrying hydraulic fluid between two points in the hydraulic system and having a higher pressure first line end, a lower pressure second line end, a certain inner fluid line outside diameter, and inner fluid line couplers at its first and second line ends, a reinforcing sleeve having a reinforcing sleeve inside diameter larger than the inner fluid line outside diameter to contain the inner fluid line, an outer fluid line containing the reinforcing sleeve and the inner fluid line and having a first line end, a second line end, outer fluid line couplers at its first and second line ends and an outer fluid line inside diameter larger than the reinforcing sleeve outside diameter so that a containment space is provided between the reinforcing sleeve and the outer fluid line, a line coupling structure connected to the inner and outer fluid line first ends, a manifold structure connected to the inner and outer fluid line second ends and including a manifold body, a chamber in the manifold body which receives one of the outer fluid line couplers for mounting the outer fluid line to the manifold structure, a longitudinal fluid passageway which receives one of the inner fluid line couplers for mounting the inner fluid line to the manifold structure, a pair of lateral bores extending between the chamber and opposite sides of the manifold body, a lateral reclamation line connected in fluid communication by reclamation line couplers to one of the lateral bores and an upstream point of the hydraulic system, and a sight glass connected to the lateral bore opposite the lateral bore in which the reclamation line coupler is connected for providing visual indication of fluid outside of the inner fluid line.

The manifold body is preferably a manifold block, the chamber is preferably internally threaded and the outer fluid line couplers are externally threaded so that one outer fluid line coupler can fasten into the chamber. The longitudinal fluid passageway is preferably internally threaded and the inner fluid line couplers are preferably externally threaded so that one inner fluid line coupler can fasten into the longitudinal fluid passageway, the longitudinal fluid passageway opens out of a face of the manifold block opposite the chamber, and the lateral bores are preferably internally threaded and the reclamation line couplers and the sight glass are preferably externally threaded so that one reclamation line coupler can fasten into one lateral bore and the sight glass can fasten into the opposite lateral bore. The coupling structure preferably includes both inner and outer fluid line coupler fittings. The reclamation line couplers preferably include a check valve to prevent the backflow of fluid into the manifold structure.

The manifold block preferably includes first and second block portions interconnected with fasteners, the longitudinal fluid passageway preferably extends through the first block portion and the chamber preferably extends into the second block portion. The apparatus preferably additionally includes a block pin to further interconnect the first and second block portions and to retain the block portions against sliding movement relative to each other. The apparatus preferably additionally includes a circular O-ring groove in a face of the first block portion abutting the second block portion and an O-ring fitted into the O-ring groove for preventing leakage of fluid from the chamber between the block portions. The coupling structure preferably includes a second manifold structure, where the lateral bore in the second manifold structure is closed and sealed with a plug.

A reclamation apparatus is also provided for capturing leaking hydraulic fluid in a hydraulic system having a higher pressure system end and a lower pressure system end and for delivering the captured fluid back into the system, including an inner fluid line for carrying hydraulic fluid between two points in the hydraulic system having a higher pressure first line end, a lower pressure second line end and a certain inner fluid line outside diameter, a reinforcing sleeve having a reinforcing sleeve inside diameter larger than the inner fluid line outside diameter for containing the inner fluid line, an outer fluid line containing the reinforcing sleeve and the inner fluid line and having a first line end, a second line end and an outer fluid line inside diameter larger than the reinforcing sleeve outside diameter so that a containment space is provided between the reinforcing sleeve and the outer fluid line, a line coupling structure connected to the inner and outer fluid line first ends and a manifold structure connected to the outer fluid line. The manifold structure includes a reclamation line in fluid communication with the containment space at one point in the hydraulic system and connected to another point in the hydraulic system so that the leaked fluid re-enters that inner fluid line.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figures 1, 2, 3, 4, 5:
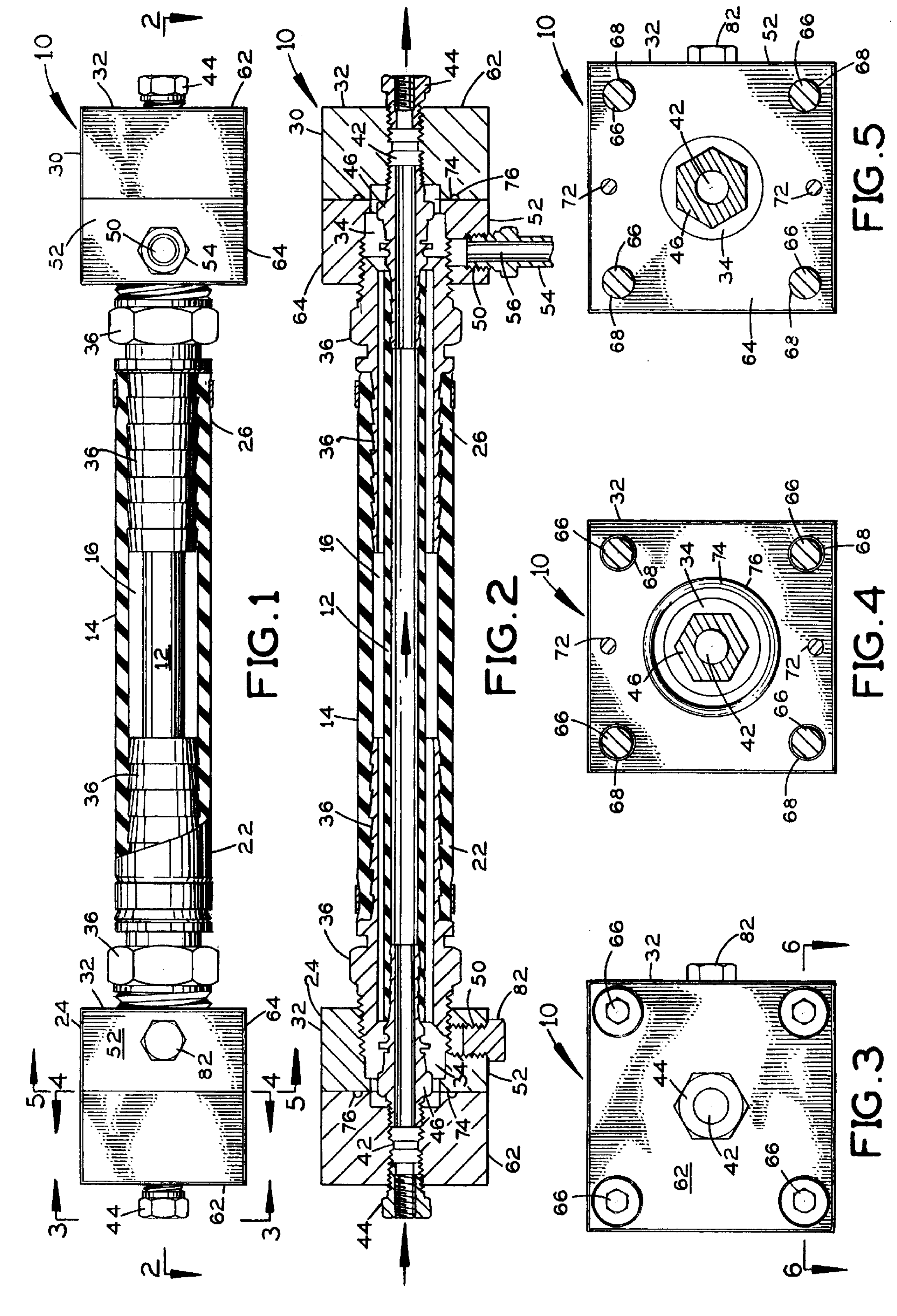
FIG. 1 is a side view of the apparatus with the outer fluid line shown in partial cross-section, revealing the line couplers, the coupling structure and lateral bore plug, and the manifold structure and reclamation line fitting.
FIG. 2 is a full cross-sectional view of the apparatus of FIG. 1 taken along line 2—2, revealing the inner design of the coupling and manifold structures.
FIG. 3 is an end view of the apparatus of FIG. 1 taking along line 3—3, showing the remote end face of the coupling structure, the standard fitting in the longitudinal fluid passageway, and the four bolts in the manifold block corners holding the two manifold block portions together.
FIG. 4 is a cross-sectional view of the apparatus of FIG. 1 taken along line 4—4, showing the inwardly directed face of the first manifold block portion, revealing the pins and block chamber.
FIG. 5 is a cross-sectional view of the apparatus of FIG. 1 taken along line 5—5, showing the inwardly directed face of the second manifold block portion.

As required, detailed embodiments of the present invention are disclosed herein; however, it is to be understood that the disclosed embodiments are merely exemplary of the invention which may be embodied in various forms and utilized in various applications. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Figures 6, 7, 8:
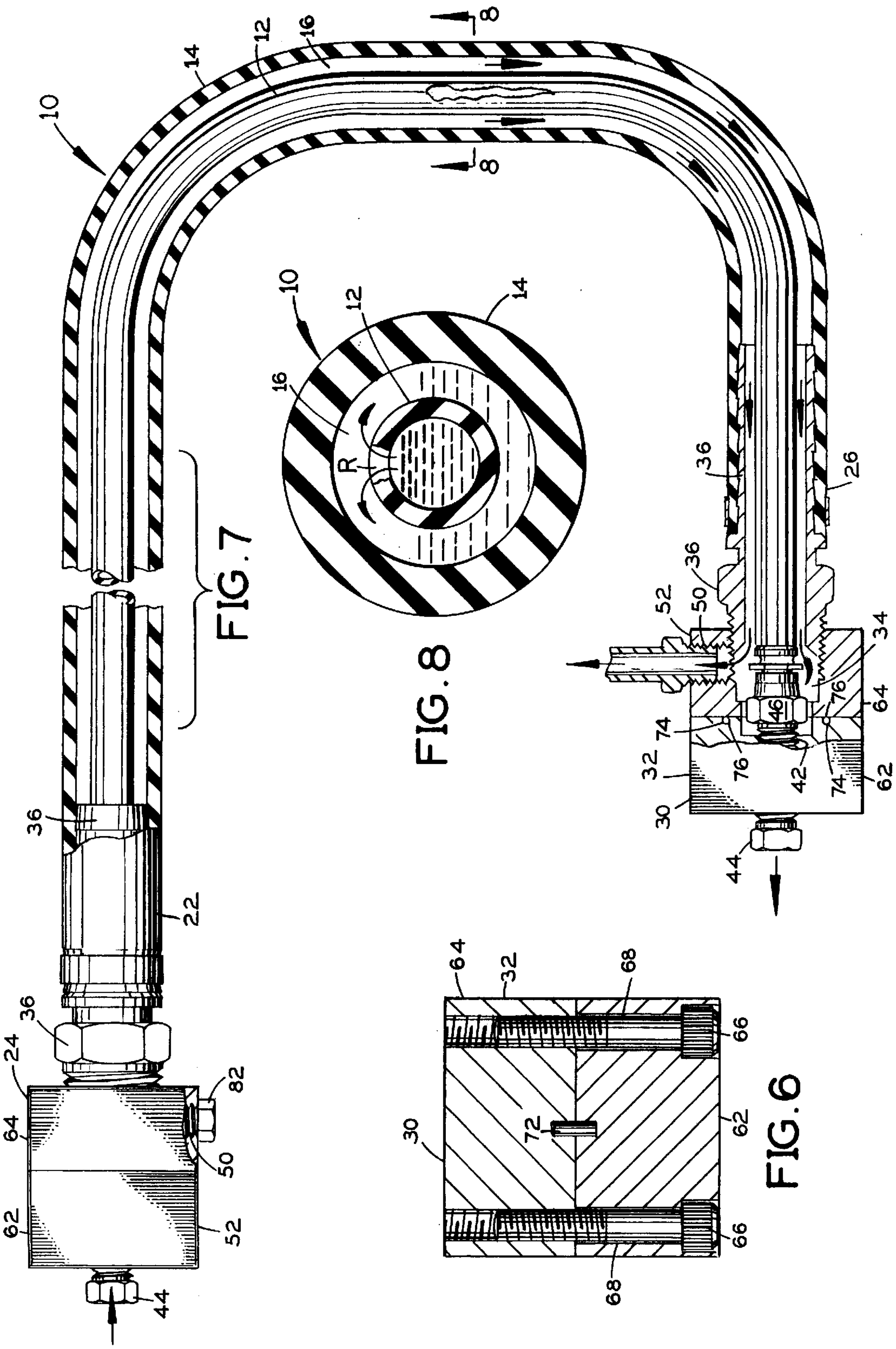
FIG. 6 is a cross-sectional view of the coupling structure of FIG. 3, taken along line 6—6, revealing two of the manifold block bolts and one of the manifold block pins.
FIG. 7 is a side view of the apparatus, shown with the flexible inner and outer fluid lines arched, and with the outer fluid line in partial cross-section, revealing a hypothetical rupture in the inner fluid line, and showing with arrows the direction of fluid flow within the outer fluid line and into the reclamation line. Also shown are the block chamber, the lateral bore and line second end couplers at the manifold structure.
FIG. 8 is a cross-sectional view taken along line 8—8 of FIG. 7, showing the escape of hydraulic fluid from the inner fluid line, through the hypothetical rupture, and into the annular containment space between the inner and outer fluid lines where the escaping fluid is captured and subsequently routed into the reclamation line.

Referring to FIGS. 1–8, a reclamation apparatus 10 is disclosed for capturing fluid leaking from a ruptured hydraulic line and for delivering the leaked fluid back into the hydraulic system.

Apparatus 10 includes in inner fluid line 12 having a certain inner fluid line 12 outside diameter, for carrying hydraulic fluid between two points in a hydraulic system such as between a fluid pump and a fluid powered mechanism. See FIGS. 1, 2 and 7. Apparatus 10 also includes an outer fluid line 14 sized to contain inner fluid line 12 and having an outer fluid line 14 inside diameter larger than the inner fluid line 12 outside diameter so that a substantially annular containment space 16 is provided between inner fluid line 12 and outer fluid line 14. Inner and outer fluid lines 12 and 14, respectively, are concentrically connected at a higher pressure first line end 22 to a coupling structure 24 and at a lower pressure second line end 26 to a manifold structure 30. Coupling structure 24 may be of conventional construction, differing only in the provision of concentric line coupler fittings.

Manifold structure 30 includes a manifold block 32 having a recessed internally threaded block chamber 34 which receives an externally threaded outer fluid line coupler 36 for mounting outer fluid line 14 second line end 26. Manifold structure 30 also includes an internally threaded longitudinal fluid passageway 42 which receives an axially protruding inner fluid line coupler 46 for mounting of the inner fluid line 12 second line end 26. Longitudinal fluid passageway 42 opens out of a face of the manifold block 32 opposite block chamber 34 and receives a standard nipple fitting 44.

Block chamber 34 opens laterally into an internally threaded lateral bore 50 opening out of a block 32 side face 52 for receiving a lateral reclamation line 54 fluid receiving end 56. Reclamation line 54 is preferably made of metal and has a fluid delivery end (not shown) connected to the lower pressure side of the system pump (not shown) or to another upstream point of the system.

Manifold block 32 is preferably divided into first and second block portions 62 and 64, respectively, interconnected with four block bolts 66 passing through bolt passageways 68 located at block 32 corners. See FIGS. 3 and 6. Longitudinal fluid passageway 42 extends through first block portion 62 and the block chamber 34 extends through second block portion 64 and partly into first block portion 62. See FIG. 2. A pair of block pins 72 further interconnect first and second block portions 62 and 64, respectively, to retain the block portions against sliding movement relative to each other. See FIGS. 4 and 6. An O-ring 74 is fitted into a circular O-ring groove 76 in the face of first block portion 62 abutting second block portion 64 to prevent any leakage of fluid from the block chamber 34 between block portions 62 and 64. See FIGS. 4 and 7.

In the event inner fluid line 12 ruptures, escaping fluid is contained by outer fluid line 14, and fills the containment space 16 between inner and outer fluid lines 12 and 14, respectively. See FIG. 7. The fluid pressure causes the fluid escaping from the inner fluid line 12 to flow within and along outer fluid line 14, through block chamber 34 and into reclamation line 54, and to be subsequently delivered back into the system. In this way the system continues to function until the rupture R is repaired or inner fluid line 12 is replaced. Coupling structure 24 at the higher pressure end may be a second manifold block 32, the lateral bore 50 of this second block 32 being stoppered with a threaded plug 82. See FIG. 7.

SECOND PREFERRED EMBODIMENT

Figures 9, 10, 11, 12:
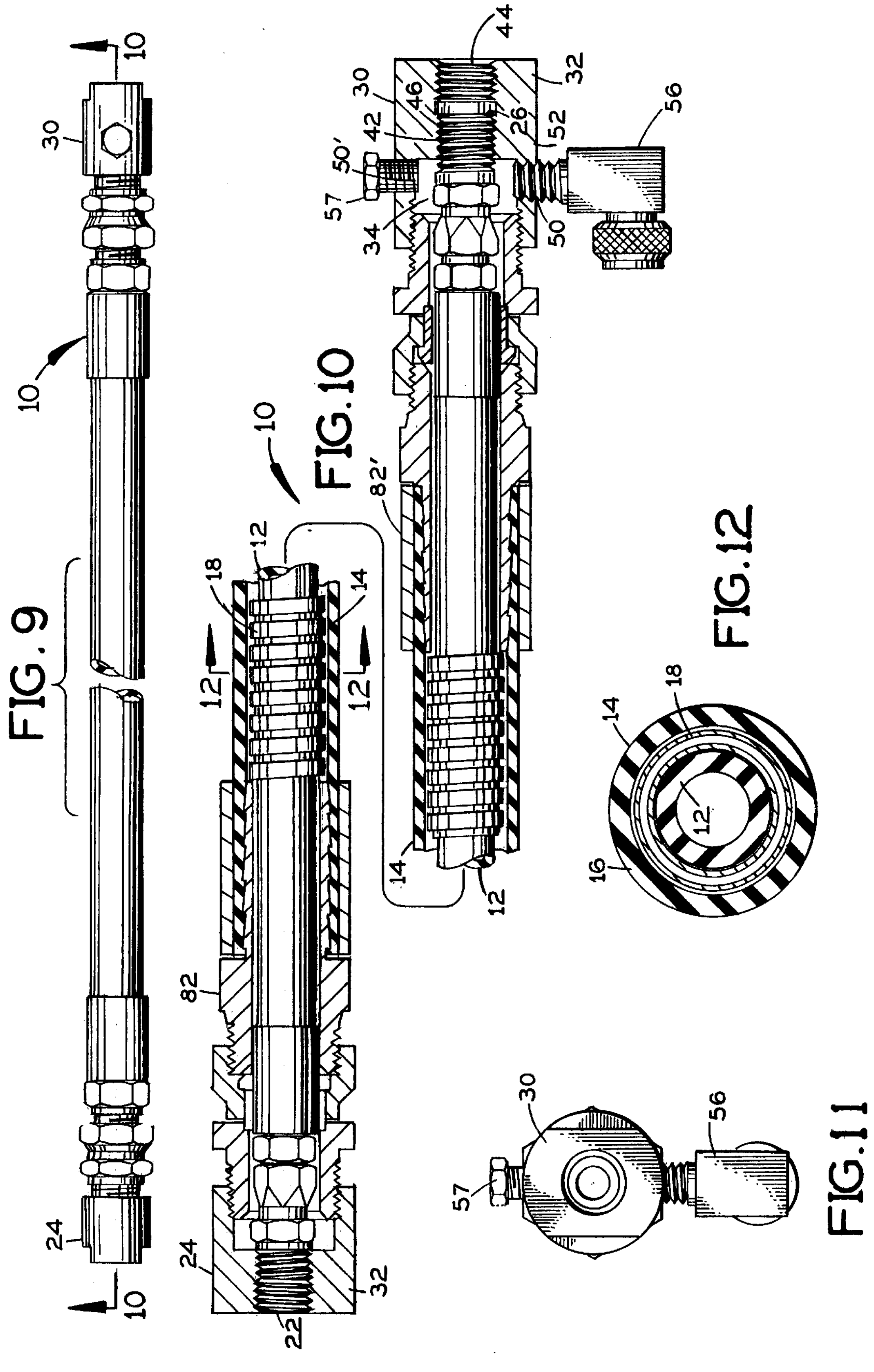
FIG. 9 is a side view of another embodiment of the apparatus with the outer fluid line shown in partial cross-section.
FIG. 10 is a cross-sectional view of the apparatus of FIG. 9 taken along line 10—10, revealing the reinforcing sleeve, the line couplers, and the inner design of the coupling and manifold structures.
FIG. 11 is an end view of the apparatus of FIG. 9, showing the remote end face of the coupling structure and the standard fitting in the longitudinal fluid passageway.
FIG. 12 is a cross-sectional view of the apparatus of FIG. 10 taken along line 12—12, showing the inner fluid line, the reinforcing sleeve, the outer fluid line and the containment space.
Figure 13:
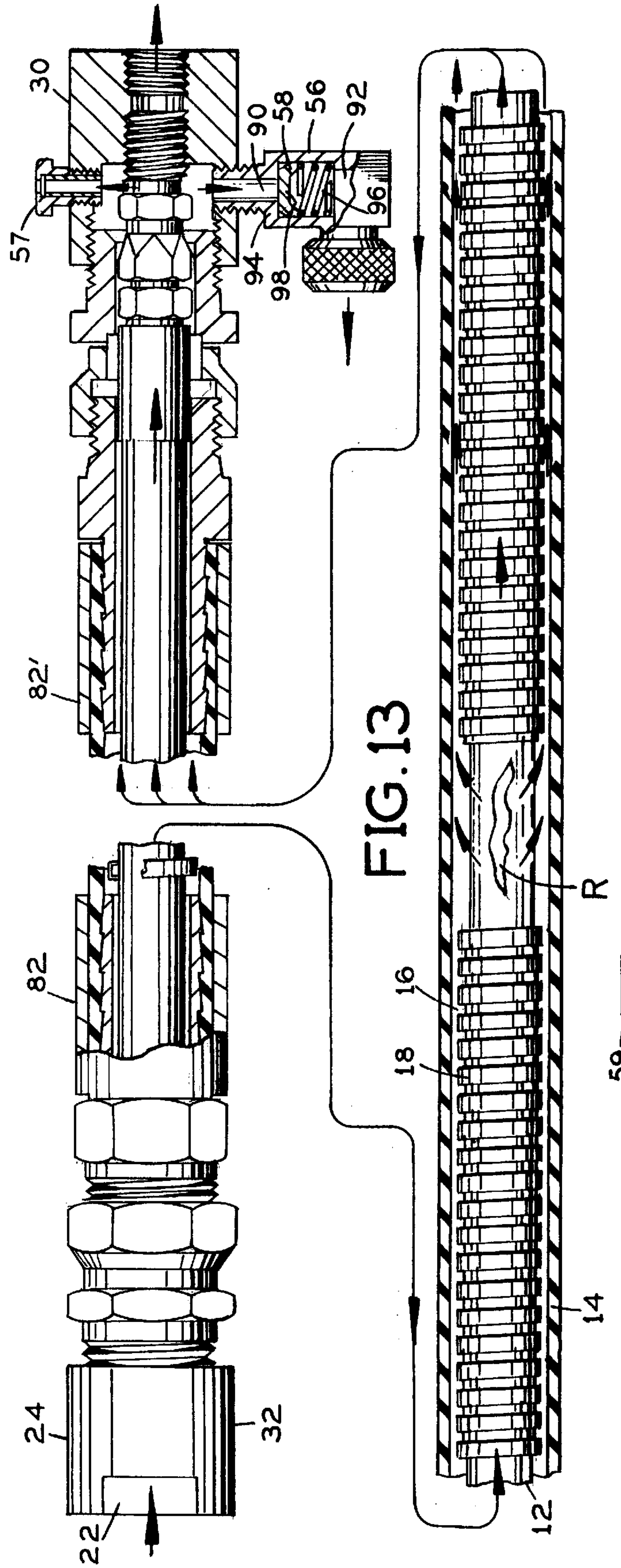
FIG. 13 is a side view of the apparatus, with the outer fluid line and the reinforcing sleeve shown in partial cross-section, revealing a hypothetical rupture in the inner fluid line and showing, with arrows, the direction of fluid flow within the outer fluid line and into the reclamation line. Also shown are the manifold chamber, the lateral bore, the second line end couplers at the manifold structure, the check valve and the sight glass.
Figure 14:
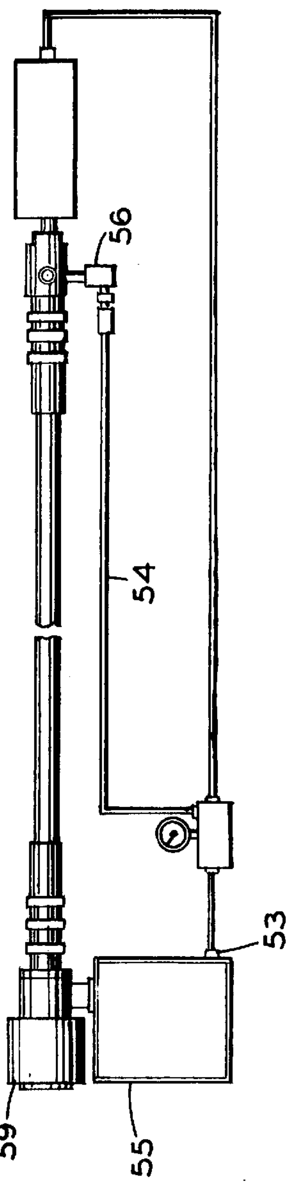
FIG. 14 is a side view of the apparatus configured in a hydraulic system comprising hydraulic equipment, a hydraulic pump, and a reservoir.

Referring to FIGS. 9–14, a reclamation apparatus 10 is disclosed for capturing fluid leaking from a ruptured hydraulic line and for delivering the leaked fluid back into the hydraulic system.

Apparatus 10 includes an inner fluid line 12 for carrying hydraulic fluid between two points in a hydraulic system such as between a fluid pump and a fluid powered mechanism. See FIG. 9, 10, 13 and 14. Apparatus 10 also includes a flexible reinforcing sleeve 18 sized to contain inner fluid line 12 and having a certain reinforcing sleeve outside diameter. Reinforcing sleeve 18 is permeable, thereby permitting fluid from a ruptured inner fluid line 12 to seep through. Apparatus 10 also includes an outer fluid line 14 sized to contain reinforcing sleeve 18 and having an outer fluid line 14 inside diameter larger than the reinforcing sleeve 18 outside diameter so that a substantially annular containment space 16 is provided between reinforcing sleeve 18 and outer fluid line 14. Inner and outer fluid lines 12 and 14, respectively, are concentrically connected at a higher pressure first line end 22 to a coupling structure 24 and at a lower pressure second line end 26 to a manifold structure 30. Coupling structure 24 may be of conventional construction, differing only in the provision of concentric line coupler fittings.

Manifold structure 30 includes a manifold block 32 having a recessed internally threaded block chamber 34 which receives an externally threaded outer fluid line coupler 36 for mounting outer fluid line 14 second line end 26. Manifold structure 30 also includes an internally threaded longitudinal fluid passageway 42 which receives an axially protruding inner fluid line coupler 46 for mounting of the inner fluid line 12 second line end 26. Longitudinal fluid passageway 42 opens out of a face of the manifold block 32 opposite block chamber 34 and receives a standard nipple fitting at 44.

Block chamber 34 opens laterally into first and second internally threaded lateral bores 50, 50' opening out of opposite block 32 side faces 52, 52' for receiving a lateral reclamation line 54 externally threaded coupler 56 and an externally threaded sight glass 57. See FIGS. 10, 11 and 13. Reclamation line 54 is preferably made of metal and has a fluid delivery end 53 connected to the reservoir 55 feeding the lower pressure side of the system pump 59 or to another upstream point of the system. Sight glass 57 is structured to provide visual indication of fluid outside of the inner fluid line 12.

Reclamation line coupler 56 includes a longitudinal fluid passageway 90 having a certain inside diameter and leading to a chamber 92 having a certain inside diameter greater than the inside diameter of the reclamation line coupler 56 longitudinal fluid passageway 90. The inside diameters of the reclamation line coupler 56 chamber 92 and longitudinal fluid passageway 90 define a flanged portion 94. Reclamation line coupler 56 also includes a check valve 58 for preventing backflow of fluid into the manifold structure 30. Check valve 58 includes a spring 96 mounted longitudinally within the reclamation line coupler 56 chamber 92 and a circular disk 98 located between the flanged portion 94 and the spring 96. Disk 98 has an outside diameter greater than the reclamation line coupler 56 longitudinal fluid passageway 90 inside diameter and less than the reclamation line coupler 56 chamber 92 inside diameter. Spring 96 is structured and disposed to press the disk 98 against the flanged portion 94 until fluid buildup within the reclamation line coupler 56 longitudinal fluid passageway 90 causes the disk 98 to compress the spring 96, thereby allowing fluid to flow through the reclamation line coupler 56 and into the reclamation line 54. Disk 98 could be replaced with a ball or other similar structure.

In the event inner fluid line 12 ruptures, escaping fluid seeps through reinforcing sleeve 18, is contained by outer fluid line 14, and fills the containment space 16 between reinforcing sleeve 18 and outer fluid line 14. See FIG. 5. The reinforcing sleeve 18 prevents the outer fluid line 14 from also rupturing due to the force and pressure from the inner fluid line 12 rupture. The fluid pressure causes the fluid escaping from the inner fluid line 12 to flow within and along outer fluid line 14, through block chamber 34 and into the longitudinal fluid passageway 90 of reclamation line coupler 56. Fluid buildup within the reclamation line coupler 56 longitudinal fluid passageway 90 causes the disk 98 to compress the spring 96, thereby allowing fluid to flow through the reclamation line coupler 56 and into the reclamation line 54 to be subsequently delivered back into the system. Only two PSI of pressure is needed to compress the spring 96. In this way the system continues to function until the rupture R is repaired or inner fluid line 12 is replaced. Coupling structure 24 at the higher pressure end may be a second manifold block 32. Fittings 82 and 82' receive the tubes.

Inner and outer fluid lines 12 and 14, respectively, are preferably made of high pressure flexible tubing. They may also be formed of metal, plastic or any other suitable material. Reinforcing sleeve 18 is preferably made of steel and is structured to withstand pressures exceeding 2500 PSI caused by the flow of fluid within the inner fluid line 12 during equipment operation. It may also be made of some other metal, plastic or any other suitable material structured to withstand this pressure.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A reclamation apparatus for capturing leaking hydraulic fluid in a hydraulic system having a higher pressure system end and a lower pressure system end and for delivering the captured fluid back into the system, comprising:

an inner fluid line for carrying hydraulic fluid between two points in said hydraulic system having a higher pressure first line end, a lower pressure second line end and inner fluid line coupler means at said first and second line ends, a reinforcing sleeve sized to contain said inner fluid line and having a certain reinforcing sleeve outside diameter, an outer fluid line containing said inner fluid line and said reinforcing sleeve and having a first line end, a second line end, outer fluid line coupler means at said first and second line ends, and an outer fluid line inside diameter larger than said reinforcing sleeve outside diameter such that a containment space is provided between said reinforcing sleeve and outer fluid line, a manifold structure connected to said inner and outer fluid line second ends, said manifold structure including a manifold body, a chamber in said manifold body which receives one of said outer fluid line coupler means for mounting said outer fluid line to said manifold structure, a longitudinal fluid passageway which receives one of said inner fluid line coupler means for mounting said inner fluid line to said manifold structure, and a first lateral bore extending between said chamber and a first side of said manifold body, and said manifold structure comprising a second lateral bore extending between said chamber and a second side of said manifold body opposite said first side of said manifold body and a sight glass for providing visual indication of any leaked fluid within said containment space outside of said inner fluid line in said manifold structure, said second lateral bore being internally threaded and said sight glass externally threaded for fastening into said second lateral bore, a lateral reclamation line having reclamation line coupler means and being connected in fluid communication between said first lateral bore and an upstream point of said inner line coupler means for reclaiming any leaked fluid in said containment space; said reclamation line coupler means comprising a check valve for preventing backflow of fluid into said manifold structure.

2. An apparatus according to claim 1, wherein said manifold body is a manifold block, said chamber is internally threaded and said outer fluid line coupler means is externally threaded for fastening into said chamber, said manifold structure longitudinal fluid passageway is internally threaded and said inner fluid line coupler means is externally threaded for fastening into said manifold structure longitudinal fluid passageway, said manifold structure longitudinal fluid passageway opens out of a face of said manifold block opposite said chamber, and said first lateral bore is internally threaded and said reclamation line coupler means is externally threaded for fastening into said first lateral bore.

3. An apparatus according to claim 1, wherein the coupling structure comprises inner and outer fluid line coupler fittings.

4. An apparatus according to claim 3, wherein said manifold block comprises first and second block portions interconnected with fastening means, said manifold structure longitudinal fluid passageway extends through said first block portion, and said chamber extends into said second block portion.

5. An apparatus according to claim 4, additionally comprising a block pin to further interconnect said first and second block portions and retain said block portions against sliding movement relative to each other.

6. An apparatus according to claim 4, additionally comprising a circular O-ring groove in a face of said first block portion abutting said second block portion and an O-ring fitted into said O-ring groove for preventing leakage of fluid from said chamber between said block portions.

7. An apparatus according to claim 1, wherein said coupling structure comprises a second said manifold structure, wherein said first lateral bore is closed and sealed with plug means.

8. An apparatus according to claim 1, wherein said reclamation line coupler means further comprises a longitudinal fluid passageway having a certain inside diameter and leading to a chamber having a certain inside diameter greater than said reclamation line coupler means longitudinal fluid passageway inside diameter, said inside diameters of said reclamation line coupler means chamber and said reclamation line coupler means longitudinal fluid passageway defining a flanged portion, and wherein said check valve comprises a spring mounted longitudinally within said reclamation line coupler means chamber and a disk located between said flanged portion and said spring and having an outside diameter greater than said reclamation line coupler means longitudinal fluid passageway inside diameter and less than said reclamation line coupler means chamber inside diameter, wherein said spring is structured and disposed to press said disk against said flanged portion until fluid buildup within said reclamation line coupler means longitudinal fluid passageway causes said disk to compress said spring thereby allowing fluid to flow through said reclamation line coupler means and into said reclamation line.

9. An apparatus according to claim 1, wherein said manifold structure comprises a second lateral bore extending between said chamber and a second side of said manifold body opposite said first side of said manifold body and a sight glass for providing visual indication of fluid outside of said inner fluid line, said second lateral bore being internally threaded and said sight glass externally threaded for fastening into said second lateral bore.

10. A reclamation apparatus for capturing leaking hydraulic fluid in a hydraulic system having a higher pressure system end and a lower pressure system end and for delivering the captured fluid back into the system, comprising:

an inner fluid line for carrying hydraulic fluid between two points in said hydraulic system having a higher pressure first line end and a lower pressure second line end, a reinforcing sleeve sized to contain said inner fluid line and having a certain reinforcing sleeve outside diameter, an outer fluid line sized to contain said reinforcing sleeve and said inner fluid line and having a first line end, a second line end and an outer fluid line inside diameter larger than said reinforcing sleeve outside diameter such that a containment space is provided between said reinforcing sleeve and said outer fluid line, a line coupling structure connected to said inner and outer fluid line first line ends, a manifold structure connected to said outer fluid line, wherein said manifold structure comprises a reclamation line in fluid communication with said containment space at one point in said manifold structure and connected to another point in said line coupling structure such that the leaked fluid re-enters said inner fluid line, and said reclamation line including a check valve for preventing backflow of fluid into said manifold and at least a portion of said manifold structure having threadedly coupled thereto a sight glass for providing visual indication of any leaked fluid within said containment space outside of said inner fluid line in said manifold structure.

11. A reclamation apparatus for capturing leaking hydraulic fluid in a hydraulic system having a higher pressure system end and a lower pressure system end and for delivering the captured fluid back into the system, comprising:

an inner fluid line for carrying hydraulic fluid between two points in said hydraulic system having a higher pressure first line end and a lower pressure second line end, a reinforcing sleeve sized to contain said inner fluid line and having a certain reinforcing sleeve outside diameter, an outer fluid line sized to contain said reinforcing sleeve and said inner fluid line and having a first line end, a second line end and an outer fluid line inside diameter larger than said reinforcing sleeve outside diameter such that a containment space is provided between said reinforcing sleeve and said outer fluid line, a line coupling structure connected to said inner and outer fluid line first line ends, a manifold structure connected to said outer fluid line, wherein said manifold structure comprises a reclamation line in fluid communication with said containment space at one point in said manifold structure and connected to another point in said line coupling structure such that the leaked fluid re-enters said inner fluid line, at least a portion of said manifold structure having coupled thereto a sight glass for providing visual indication of any leaked fluid within said containment space outside of said inner fluid line in said manifold structure.

12. An apparatus according to claim 11, wherein said reclamation line includes a check valve for preventing backflow of fluid into said manifold structure.

* * * * *